Dec. 13, 1927.  1,652,387
C. BARBER
FISH CREEL
Filed Feb. 23, 1927
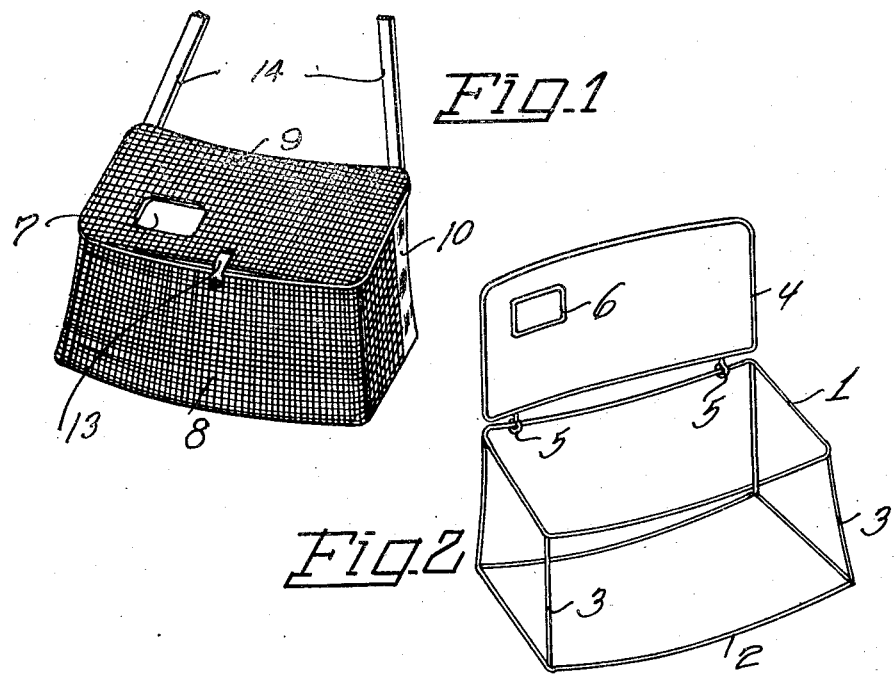
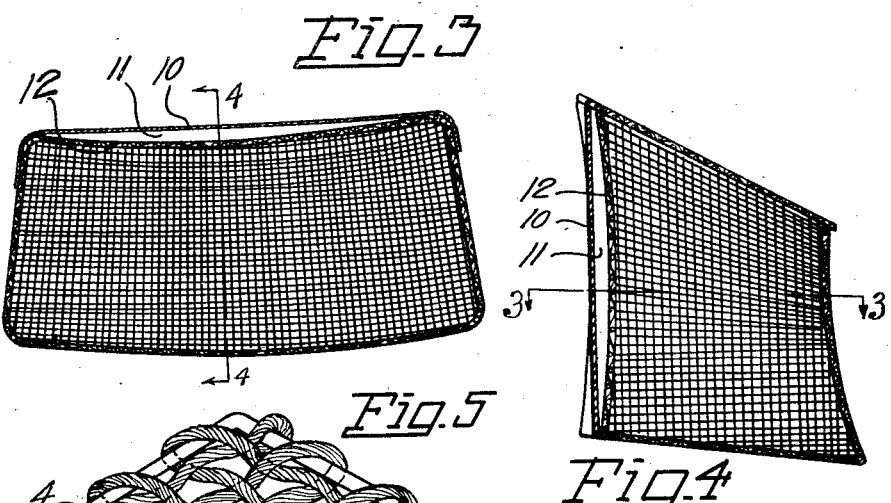
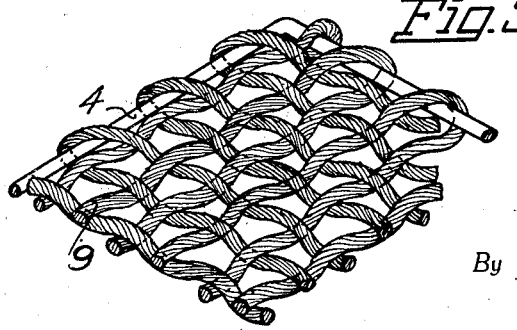
Inventor
Clinton Barber
By Herbert E. Smith
Attorney Patented Dec. 13, 1927.

1,652,387

UNITED STATES PATENT OFFICE.

CLINTON BARBER, OF ATHOL, IDAHO.

FISH CREEL.

Application filed February 23, 1927. Serial No. 170,241.

My present invention relates to improvements in fish creels for use by fishermen and others, in carrying and preserving the catch. As is well known, after the fish have been caught and removed from the water, unless they are given the proper attention as to moisture, air and a cooling temperature, they rapidly deteriorate. The primary object of my invention is the provision of a creel or carrier for the "catch" to be used by the fisherman, while at the sport, for preserving the fish as they are caught, in order that the "catch" may be maintained in sanitary and healthy condition until the fishing is completed.

In carrying out my invention I utilize a creel having the usual straps or other means for carrying or suspending it from the shoulders as the fisherman moves from place to place. The creel is provided with a loosely woven, porous body of absorbent material, by means of which the creel, when dipped into water will permit the water to have access to the fish in the creel for freshening them. When thus dipped, the body of the creel fashioned from loosely woven absorbent material, absorbs water and the moisture therefrom, due to circulation of air through the porous body, cools the atmosphere within and around the creel for the purpose of preserving the contents of the creel. The creel may be dipped in the water at convenient times to provide for a continuous evaporation of the water absorbed by its body, and means are provided on the creel for protecting the clothing of the fisherman or other person carrying the creel against wetting.

The invention consists in certain novel combinations and arrangements of parts as will hereinafter be more clearly set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of a fish creel involving the improvements of my invention.

Figure 2 is a perspective view of the framework of the creel and its lid.

Figure 3 is a horizontal sectional view at line 3—3 of Figure 4.

Figure 4 is a vertical sectional view at line 4—4 of Figure 3.

Figure 5 is a perspective view of a portion of the body or lid of the creel showing the loosely woven wall of absorbent material.

The framework of the creel and its lid may be of non-corrosive metal wire, reeds, or other suitable material and is preferably fashioned with an upper rectangular member or top frame member 1, a bottom frame 2 and corner posts 3. The frame 4 of the lid conforms to the the shape of the creel and hinge eyes 5 are utilized to hinge the lid to the frame of the creel-body. The lid is provided with a rectangular frame 6 of suitable construction to provide for the usual hole or opening 7 through which the fish are passed to the interior of the creel.

The body or enclosure which is attached to the body frame and the top enclosure attached to the lid-frame, are both fashioned of loosely woven fabric or other suitable material may be used to insure a perforated body of absorbent material that will absorb water and permit air to circulate through the walls of the body and lid. Thus the walls 8 of the creel body and the top 9 of the creel lid are shown as fashioned from loosely woven fabric of suitable texture to provide openings or pores in the walls through which the air may circulate and of absorbent material to absorb the water when the creel is dipped in the water for that purpose.

To protect the clothing of the fisherman (after he has dipped the creel in water) from the water on the body of the creel I use a waterproof sheet 10 of suitable rubberized material or rubber that is attached to the exterior of the rear side of the creel and in position to contact with the clothing of the fisherman carrying the creel. This waterproof sheet provides an air space 11 between the rear wall 12 of the creel and the sheet through which air is free to circulate to assist in cooling the atmosphere by evaporation of the water absorbed by the texture of the body walls and lid or top.

The usual fastening device 13 is provided for securing the lid in closed position on the creel, and shoulder straps 14 or other desired means may be used for suspending the creel over the shoulders of the fisherman as he proceeds with his sport.

Having thus fully described my invention, what I claim as new and desire to secure by Letters Patent is:—

1. A fisherman's creel having porous walls of absorbent material whereby it may be dipped into water to soak said walls, and one of said walls having a waterproof protector attached thereto and forming an air space between it and the creel.

2. A fisherman's creel comprising a body-frame and a hinged lid-frame, said frames having walls of loosely woven fabric of absorbent material, and a waterproof sheet attached to a wall of the creel body, for the purpose described.

In testimony whereof I affix my signature.

CLINTON BARBER.